Figure 1:
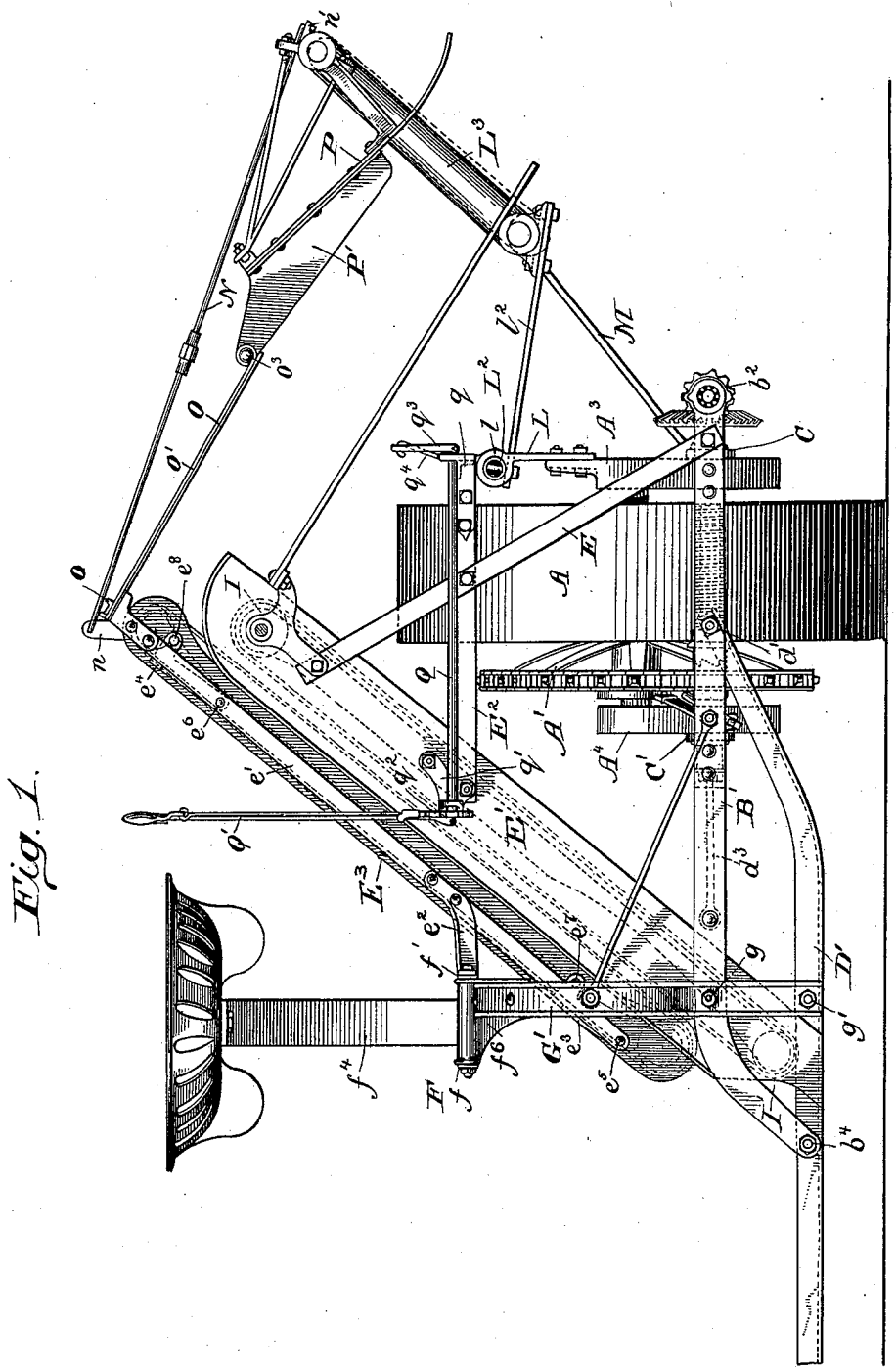

(No Model.) 6 Sheets—Sheet 1.
W. BUTTERFIELD.
HARVESTER.

No. 598,903. Patented Feb. 15, 1898.

Witnesses
Arthur Johnson
Chas. A. Steward

Inventor
William Butterfield

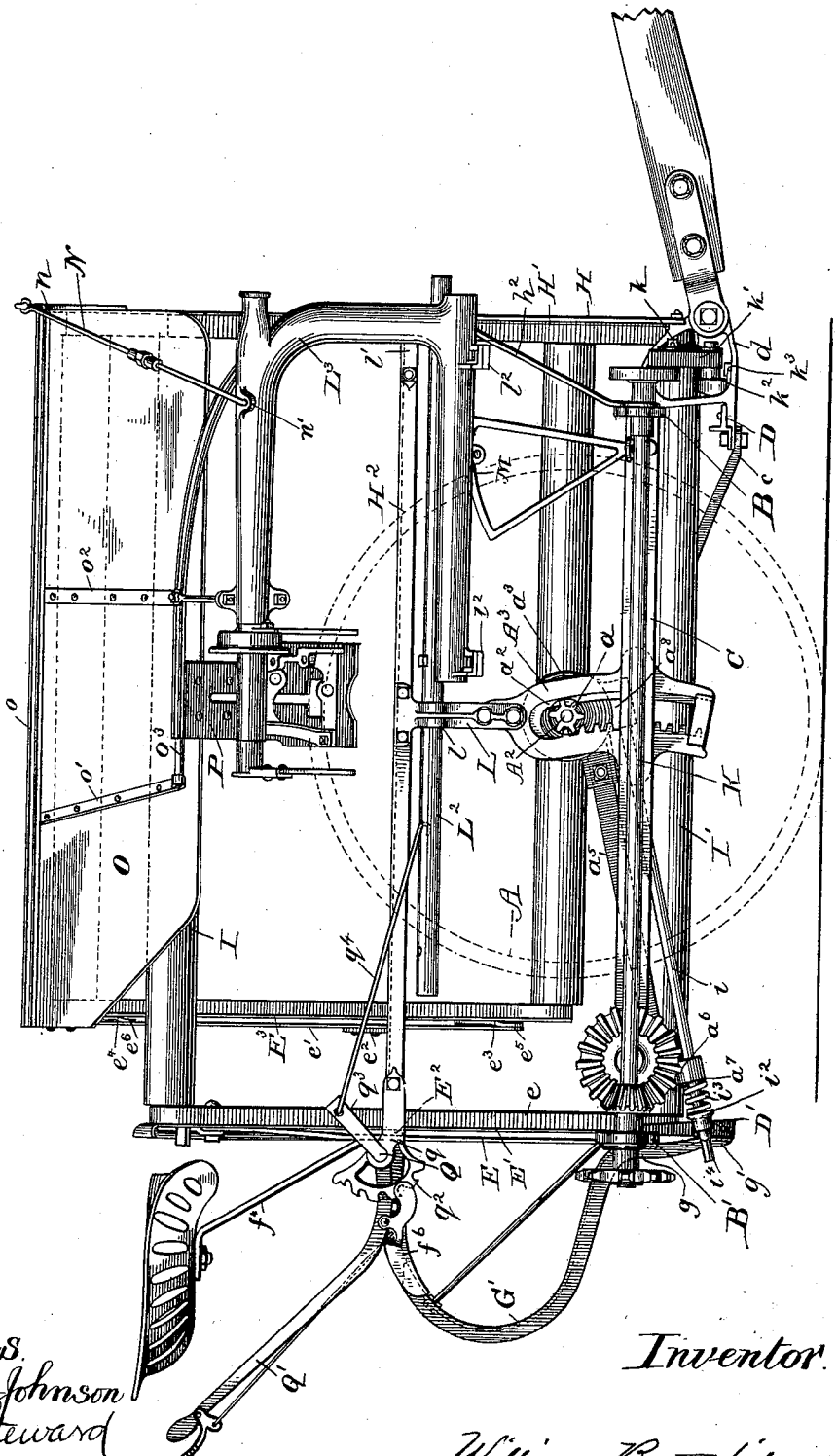

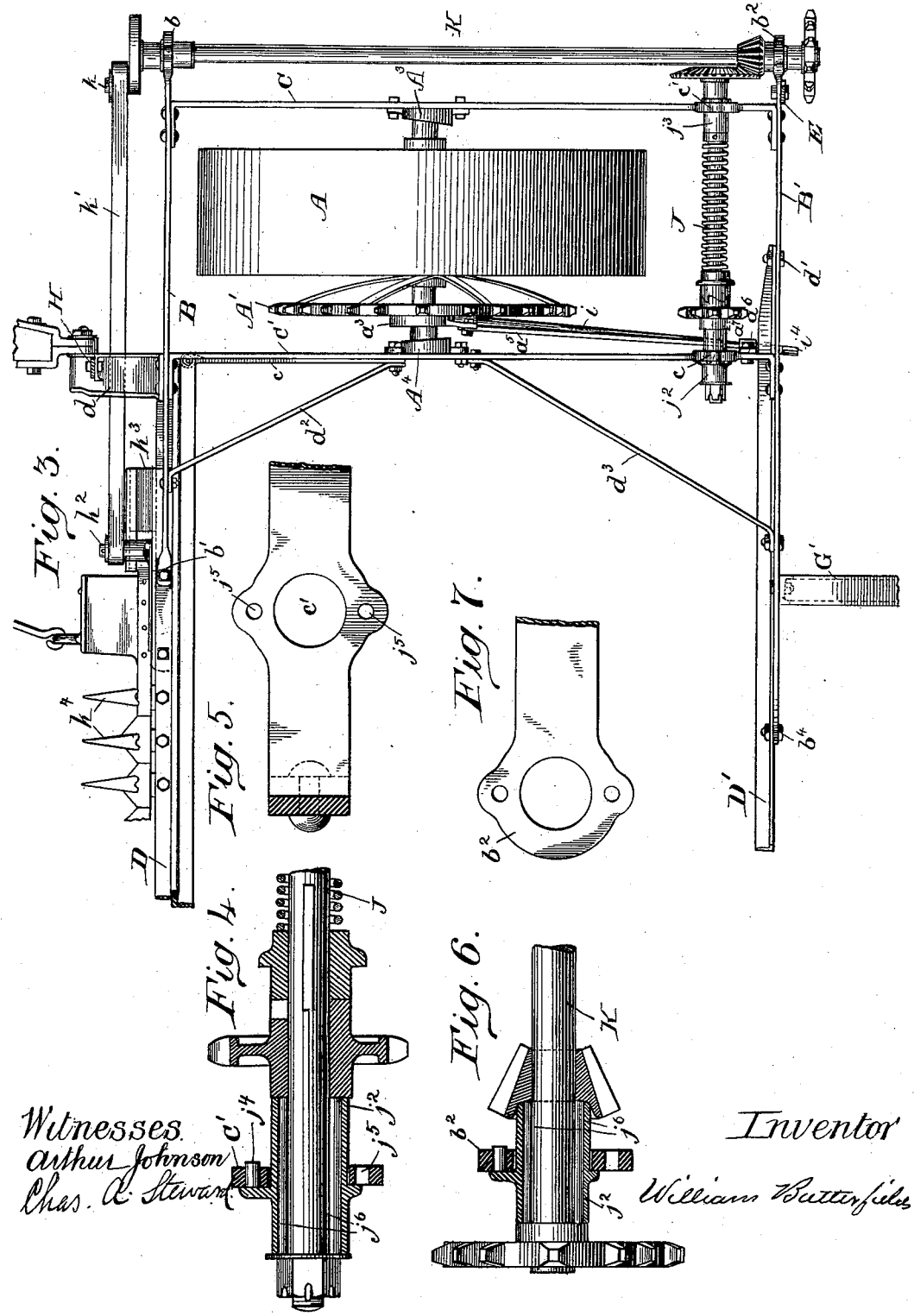

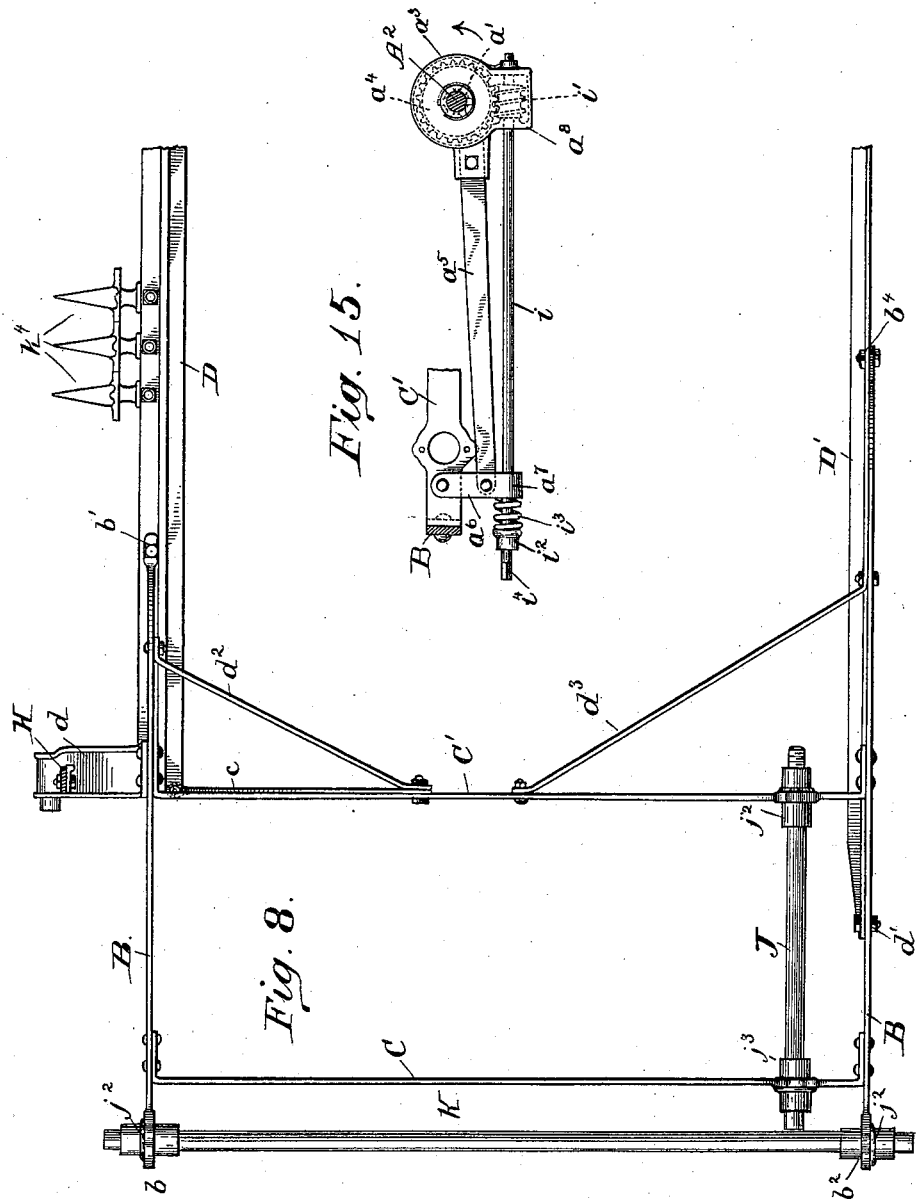

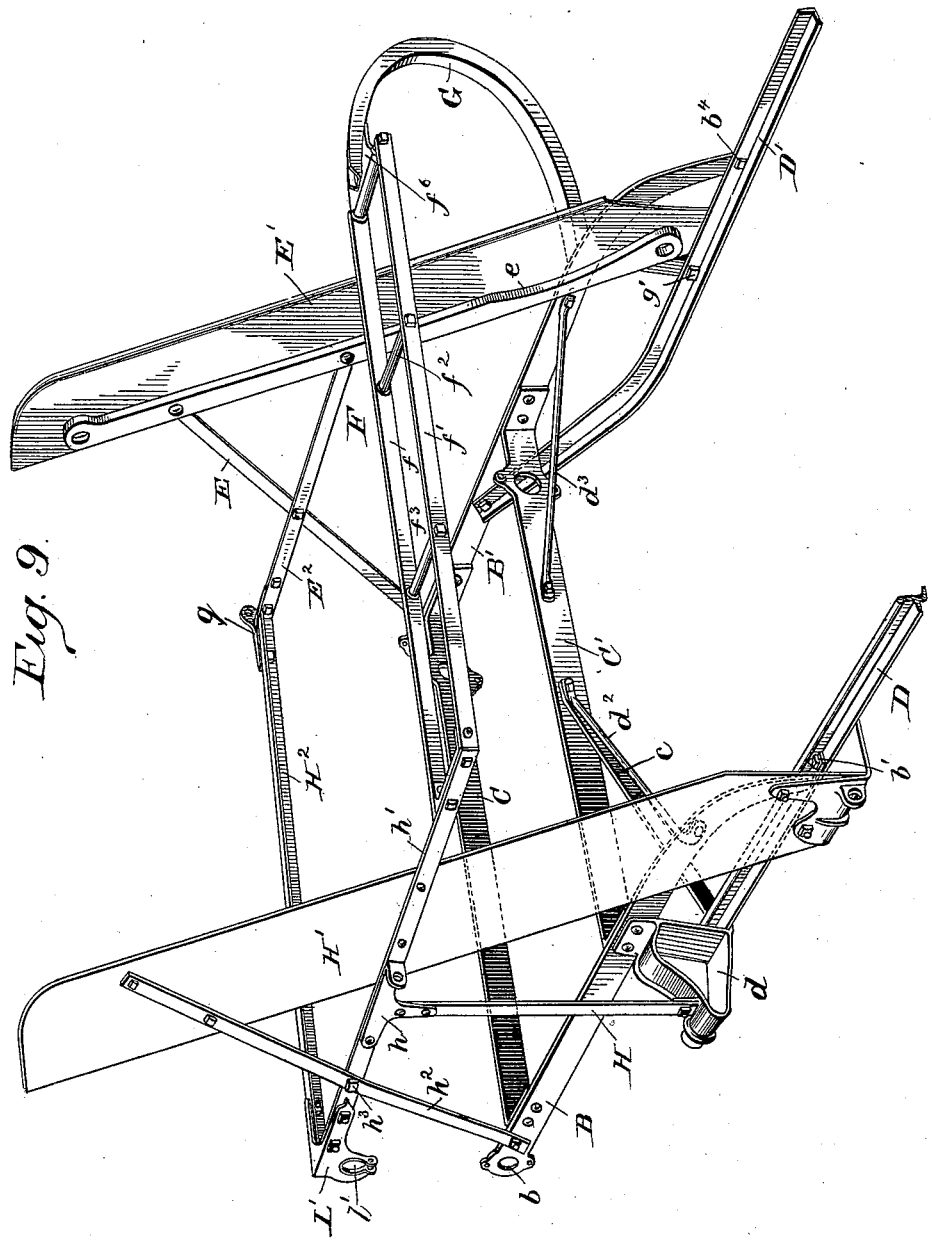

(No Model.)  
6 Sheets—Sheet 6.
W. BUTTERFIELD.
HARVESTER.
No. 598,903. Patented Feb. 15, 1898.
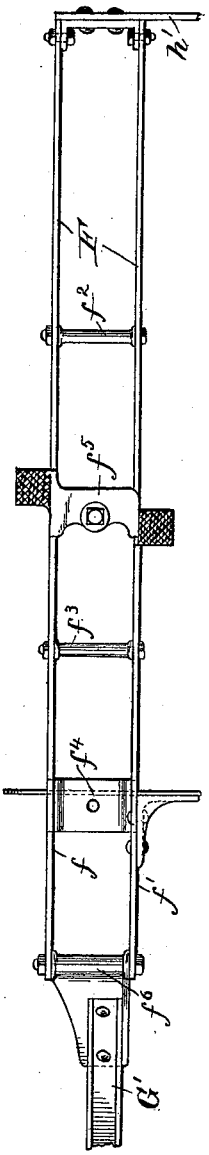
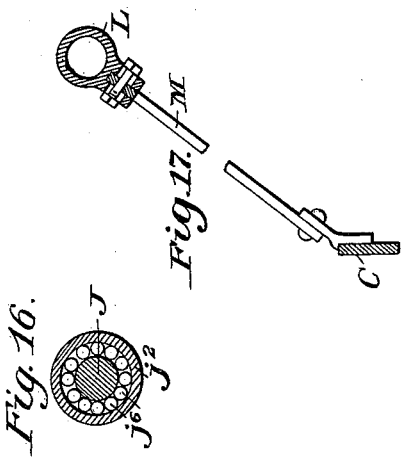
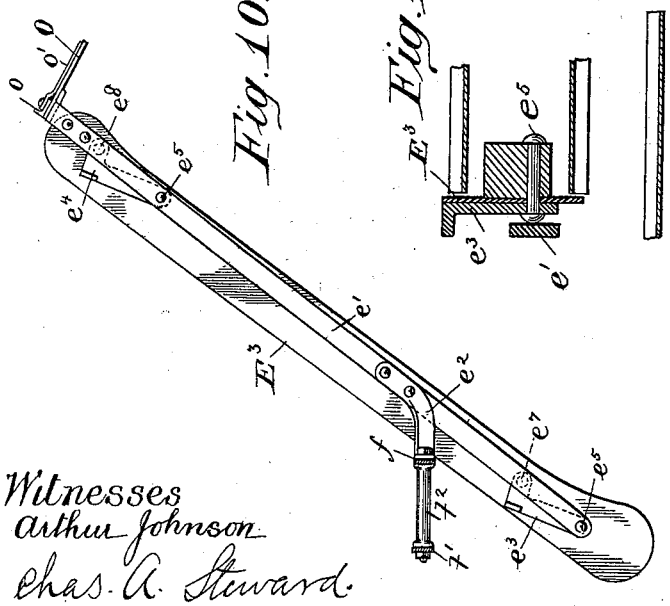
Witnesses  
Arthur Johnson  
Chas. A. Steward.
Inventor  
William Butterfield

UNITED STATES PATENT OFFICE.

WILLIAM BUTTERFIELD, OF CHICAGO, ILLINOIS, ASSIGNOR TO THE DEERING HARVESTER COMPANY, OF SAME PLACE.

HARVESTER.

SPECIFICATION forming part of Letters Patent No. 598,903, dated February 15, 1898.

Application filed April 13, 1896. Serial No. 587,276. (No model.)

*To all whom it may concern:*

Be it known that I, WILLIAM BUTTERFIELD, of Chicago, in the county of Cook and State of Illinois, have invented certain new and useful Improvements in Harvesting-Machines, of which the following is a full description, reference being had to the accompanying drawings, in which—

Figure 1 is a rear elevation of the essential parts of the framework of a left-hand-cut harvesting-machine. By "left-hand cut" is meant one in which the cutting apparatus is to the left of the driver as he sits in his seat. Fig. 2 is a stubble-side elevation of the same. Fig. 3 is a plan view of the lower parts of the main frame. Fig. 8 is a plan view of the lower portions of the main frame of a right-hand-cut harvester. By "right-hand cut" is meant one in which the cutting apparatus is on the right of the driver while sitting in his seat. Fig. 9 is a perspective view of the main frame of a left-hand-cut machine. Figs. 4, 5, 6, 7, 10, 11, 12, 13, 14, 15, 16, and 17 are details of construction.

It will be observed that in Fig. 8 the machine is shown as a right-hand cut, while in all the other figures a left-hand-cut machine and details belonging thereto are shown. This will be understood when I state that the object of my invention is in part to so shape, so proportion, and so arrange the parts of the main frame that they may be assembled so as to construct therefrom a right-hand machine or left hand at will. The importance of this will be understood when it is explained that to so design the parts that they can be used, as preferred, for a right-hand or left-hand machine only one-half of the special machinery is necessary in a factory as required for making a machine where the parts are different. The importance of the interchangeability of parts for both right and left hand machines is further demonstrated by the fact that at every one of the agencies of a large company—from one thousand to two thousand—it is necessary to keep a stock of extras, and that the ability to use the parts for both kinds of machines removes the necessity of keeping parts for each kind of machine.

I will first make clear the construction that enables me to assemble the parts in a right-hand or a left-hand cut machine at will. If comparison of Figs. 3 and 8 be made, it will be observed that one is a reversal of the other. Attention will be first devoted to these figures.

A is the master-wheel shown in Fig. 3, but may be considered as present in Fig. 8, but reversed—that is to say, the wheel simply turned so that its axle is the other end to, which will place the sprocket-wheel A' to the right in Fig. 8. The axle $A^2$ is secured to the main frame in quadrants $A^3$ and $A^4$, as shown in Fig. 1. The main frame consists of the front bar B and the rear bar B', the side bars C and C'. The bar B is provided with an eye $b$ at one end, and in this eye the crank-shaft bearing is placed. At its other end it is curved downwardly, flattened, and has the bolt-hole $b'$. Comparing Figs. 3 and 8, it will be observed that the bar B is alike in both figures, the only difference in the figures being that of position. In Fig. 9 this bar is shown in perspective, where its downward curvature can be understood. B' is also provided with an eye $b^2$ to receive the crank-shaft journal-bearing, is provided with a downward curvature near its grainward extremity, and is provided with a bolt-hole $b^4$.

D is the finger-bar, and D' the rear sill. Said rear sill is deflected upwardly near its stubble end, and at said end is provided with a bolt-hole $d'$ to correspond with a hole in the back sill. The finger-bar D at its stubble end is secured to a bracket $d$, which bracket is also secured to the front sill B of the wheel-frame.

Fig. 9 shows the relative positions of the front bar of the wheel-frame and the finger-bar and also the rear sill of the wheel-frame and the rear platform-sill.

$d^2$ and $d^3$ are braces extending from near the middle of the bar C', the former to the front bar B and the latter to the rear bar B'. The bars C and C' are alike in form and may be interchangeably used and have their ends bent L-shaped and riveted to the front and rear bars. Comparing now Figs. 3 and 8, it will become plain that the bars B and B', C and C', D and D' may be changed in their positions, so that either a right-hand or a left-hand main-wheel frame may be constructed, as stated.

E is the rear A-frame post, and E' the rear A-frame plate. This latter is made of sheet-steel, so as to be as thin as possible. The said plate and the bar E are secured together near the upper ends of both, and the foot of the post E is secured to the bar B', and the plate E' secured to the rear platform-sill at its lower end, also near its lower end to the said rear sill B'.

$E^2$ is a girth extending from the A-frame plate E' stubbleward a little beyond the post E and is secured near its end to the latter.

F is the staging for supporting the seat, foot-rest, and other parts. It is formed of two bars $f$ and $f'$, trussed together by the bolts and struts $f^2$ $f^3$, the seat-spring $f^4$, and the foot-rest $f^5$. At its rear end is the bracket $f^6$.

Secured to the rear bars of the main frame at $g$ and $g'$ is the curved arm G'. At its upper end this is secured to the bracket $f^6$ of the seat-supporting frame or staging.

H is a post extending from the bracket $d$ upward to the bracket $h$, which is secured by rivets to the girth $h'$. The latter is secured by rivets to the front A-frame plate H'.

From a point on the bar B near its stubble end, where it is secured, extends the diagonal post $h^2$ upwardly, so as to lie against the front face of the A-frame plate H', to which it is bolted. The said post is also bolted at $h^3$ to the girth $h'$. To this girth $h'$ thus supported is secured by suitable means the seat-supporting staging.

Connecting the stubble ends of the sills $h'$ and $E^2$ is the connecting-bar $H^2$.

In order to support the stubble end of the finger-bar properly, a brace $c$ extends from the rear side of the bracket $d$ to a position near the middle of the bar C'.

All the parts so far described are represented in their proper positions in the perspective view of Fig. 9.

The front A-frame plate is provided with the usual canvas-guiding bars, secured in the usual manner.

As my machine is intended to be what is termed an "open-end" harvester, I make the rear A-frame plate E' only wide enough to take one canvas-slide $e$, which corresponds in length and in position relative to the main elevator-frame to that of $h^5$. The support G' is curved well backward beyond the rear A-frame plate to permit long grain to pass beneath the seat-supports.

I and I' are the rollers, around which the lowermost of the elevating-canvases is thrown, as shown by lines in Fig. 1. These rollers are suitably journaled in bearings secured to the A-frame plates. Self-adjusting thimbles are preferably used, such as will be described as used on the crank-shaft. The rear plate $E^3$ for supporting the rear edge of the uppermost elevating-canvas is not supported rigidly from the seat-supporting staging, but adapted to be permitted to rise and fall by the following means: The bar $e'$ is rigidly connected to the seat-supporting staging by the arm $e^2$. $e^3$ and $e^4$ are links pivoted at $e^5$ and $e^6$ to the bar $e'$. They are in turn pivoted at $e^7$ and $e^8$, as shown in dotted lines in Fig. 10, to the plate $E^3$. So supported the said plate and the canvas-guide secured thereto, and consequently the rollers supported therein, are adapted to move to and from the lowermost elevating-canvas. These parts are shown in their two positions in Figs. 1 and 10—in the former closed toward the lowermost elevating-canvas and in the latter moved to the position they occupy when away therefrom.

The main-wheel axle is provided with pinions $a$ and $a'$. (Seen in Fig. 2 and shown in dotted lines in Fig. 15.) These pinions are adapted to mesh into the quadrants before mentioned and when said axle is rotated within the wheel to carry the said quadrants and the frame supported thereon to a high or low position, as required.

In order that the axle may serve as a tie between the bars C and C', a flange $a^2$ extends between the said pinions and the hub of the wheel, so that one of the quadrants cannot move by a twisting of the frame without carrying the other with it, the effect being to utilize the stiffness of both the bars to which the quadrants are secured.

The mechanism for rotating the axle in either direction is shown in Fig. 15, where $a^3$ is a casing surrounding a worm-wheel $a^4$. To this casing is connected the bar $a^5$, said bar extending rearwardly some distance and connected to the frame-bar C' by means of the link $a^6$. This link is provided with an eye $a^7$ at its lower end. The bar $a^5$ is for the purpose of preventing the casing $a^3$ from rotating around the axle as an axis.

In the lower portion of the casing $a^3$ is a housing $a^8$, and in this is journaled the shaft $i$. This shaft is also journaled in the eye $a^7$. The worm $i'$ is secured to the shaft $i$, so as to be compelled to rotate therewith; but the said screw is shorter than the housing in which it is placed.

Upon the shaft $i$ is secured the collar $i^2$, and between the said collar and the support $a^7$ is placed a spring $i^3$.

The raising and lowering device, as shown in Fig. 15, may be considered as applied to left-hand-cut machine, in which event the effort of the machine being to rotate the axle indicated by the arrow in said figure and the worm-wheel with it stress will be brought upon the worm and consequently the worm-shaft, and that will exert a pressure upon the spring $a^3$. The main frame then may be considered as spring-supported to a limited extent, the spring $i^3$ being sufficient to take away sudden jars due to traveling over hard roads, thereby reducing to the minimum the shocks that would affect the integrity of the main frame. The worm-shaft $i$ is squared at $i^4$ to receive a crank, wrench, or other suitable means for rotating it.

The side bars C and C' of the main frame I enlarge, as shown at $c'$ in Fig. 5, and through the enlargement pass the sleeves $j^2$ and $j^3$, that serve as journal-bearings for the cross-shaft J. In order to prevent these sleeves from turning with the shaft, a lug is thrown out having a stud $j^4$ and adapted to enter one of the holes $j^5$. These sleeves, as shown in Fig. 4, are made sufficiently large to take rollers $j^6$. The sleeves are not made to fit the holes $j'$ tightly, but are left so loose as to adjust themselves in line with the shaft.

Upon the cross-shaft is placed a spring, clutch, sprocket-wheel, and bevel-gear, as usual. At the ends of the bars B and B' they are enlarged, as shown at $b$ and $b^2$, and sleeves like that shown in Fig. 4 are provided identical in construction with those just described, and shown in Fig. 4. Through these bearings is placed the crank-shaft K. At the front of the shaft is the crank-wheel, having the wrist $k$, on which is the pitman $k'$, reaching to the knife-head $k^2$, which is guided by the slotted plate $k^3$. To the finger-bar is secured the usual guards $k^4$. A chain is thrown around the sprocket-wheel A' upon the axle and that upon the cross-shaft, as usual. Extending upward from the quadrant $A^3$ and connected to the bar $H^2$ is the strut L. Through this is formed the eye $l$. The bars $H^2$ and $h'$ are secured together by an angle-piece L', having the eye $l'$.

$L^2$ is a bar, preferably gas-pipe, sliding through the eye $l$ and that of $l'$. The eye $l'$ is slotted downwardly, as shown in Fig. 9, so that an antifriction-roller can be placed between. To the gas-pipe $L^2$ the binder-supporting bars $l^2$ are secured and extended stubbleward, as shown in Figs. 1 and 2. At the stubble end these are secured to the binder-frame $L^3$, as shown in the same figures.

M is a rocker having an eccentric curve, pivoted to and extended upwardly and outwardly to reach beneath the lower portion of the said binder-frame, as shown in Fig. 2. In order to prevent it from falling either forward or rearward, it is loosely connected to the rear portion of the said binder-frame. The rocker M is pivoted to a bracket $m$, conveniently secured to the main frame, and is held to the binder-frame by a bolt that goes through a hole in a lug projecting from said binder-frame, against which the rocker lies, as shown in Fig. 17. It is sufficient to say that the main weight of the binder is supported upon this rocker and the bar L, which is adapted to slide backward and forward in the main frame. In order to give steadiness to the binder thus supported, I extend a link N from the upreaching arm $n$ on the front A-frame to a lug $n'$ in the upper portion of the binder-frame.

In Fig. 2 the binder-frame is shown in its rearmost position of adjustment and the link N swung to the angle shown; but it must not be forgotten that in Fig. 2 the said link is foreshortened, so that the angle seems greater than it is in fact. Fig. 1 shows the link in its proper position. When the binder moves fore and aft, the lug $n'$ moves in the arc of a circle, and the arc of the rocker is eccentric to its pivotal center, so that when the link is in the position in which it is parallel with the elevator side the eccentricity of the rocker will result in the lowering of the binder-frame a sufficient distance to keep the lug $n'$ in its arc of movement without moving said binder-frame outwardly. This results in a slight raising and lowering of the binder-frame instead of a slight rocking movement outwardly and inwardly as the said frame is moved from its rearmost to its forward position of adjustment, and therefore prevents the displacement of the other parts of the binding attachment. The amount of movement is shown by the dotted lines in Fig. 1. Thus supported I avail myself of the binder-frame itself to sustain the uppermost elevating-canvas frame and the grain-shield O, the latter being secured thereto by means of suitable bolts passing through its downturned ends that lap onto the A-frame plates, as shown in Figs. 2 and 10. The grain-shield O is stiffened by the bar $o$, just referred to, and the bars $o'$ and $o^2$ riveted thereto. The latter bars have eyes turned in their lower ends and receive a stiff rod $o^3$.

P may be considered as the breastplate of any of the usual forms of knotters suitably secured to the knotter-frame upon the knotter-driving shaft of the binder-frame.

P' are the ordinary cheek-pieces, secured to the breastplate. These are provided with holes, through which the rod $o^3$ passes. It will thus be observed that the lower edge of the grain-shield O is sustained by the knotter-frame. Reference to Fig. 1 will show also that the upper end of the bar $e'$ is also held a definite relative distance from the binder through the instrumentality of the cheek-piece of the breastplate and the grain-shield. As the binder is moved fore and aft the radius-bar N moves in the slight arc of a circle, as stated, the effect of which is to move the binder slightly; but although the movement of the said binder is imparted to the grain-shield and through that to the support $e'$ it does not affect the position of the latter materially and does not, in fact, affect the position of the upper elevating-canvas at all, for the reason that the elevator-canvas is adapted to lie close to the lower elevating-canvas except when forced away therefrom by the swath of grain being elevated. In order to give more room for the heads of long straws, the uppermost elevator is narrowed at its rear, as shown in Fig. 2.

Q is a rock-shaft supported in the bracket $q$ of the main frame and in the bracket $q'$ on the rear elevator-frame. On this latter support is formed the quadrant $q^2$. The said shaft is provided at its stubble end with the arm $q^3$, and from it to the gas-pipe $L^2$ extends the link $q^4$. At the stubble end a lever $Q'$ extends upward from the said shaft Q and is provided with a latch-lever. By movement of this lever (best shown in Fig. 2) the binder is moved forward and backward.

What I claim as my invention, and desire to secure by Letters Patent, is—

1. In a harvester-frame and in combination with the platform, a front sill having an aperture formed in one end thereof to support a journal-bearing and having means for attachment to the finger-bar of said platform at the opposite end, a rear sill having formed therein at one end an aperture in which is supported a journal-bearing and having at its opposite end means for attaching it to the rear sill of said platform and to cross-sills, duplicates of each other, connecting said front and rear sills, said front, rear and cross sills formed substantially as described, whereby they can be assembled to make either a right-hand or a left hand-frame, substantially as set forth.

2. In a harvester-frame and in combination with the platform and the main wheel, a front sill having an enlarged end in which a hole is formed for supporting a journal-bearing sleeve, said enlarged end also provided with means for preventing the rotation of said sleeve and having its opposite end provided with means to secure it to the finger-bar of said platform, a rear sill having an enlarged end in which a hole is formed for supporting a journal-bearing sleeve, said enlarged end also provided with means for preventing the rotation of said sleeve and having its opposite end provided with means to secure it to the rear sill of said platform, cross-sills, duplicates of each other, having enlarged portions to support journal-bearing sleeves, each enlarged portion being provided with means to prevent the rotation of said sleeves and the said journal-bearing sleeves, substantially as described.

3. In a harvester-frame and in combination with the platform and the main wheel, a front sill having an enlarged end in which a hole is formed for supporting a journal-bearing sleeve, said enlarged end also provided with means for preventing the rotation of said sleeve and having its opposite end provided with means to secure it to the finger-bar of said platform, a rear sill having an enlarged end in which a hole is formed for supporting a journal-bearing sleeve, said enlarged end also provided with means for preventing the rotation of said sleeve and having its opposite end provided with means to secure it to the rear sill of said platform, cross-sills, duplicates of each other, having enlarged portions to support journal-bearing sleeves, each enlarged portion being provided with means to prevent the rotation of said sleeves and the said journal-bearing sleeves, said front, rear and cross sills and said journal-bearing sleeves formed substantially as described, whereby they can be assembled to make either a right-hand or a left-hand frame, substantially as set forth.

4. The combination, as an elevator-support, of a bar secured to the seat-support at its lower end and to the grain-shield rail at its upper end, the said grain-shield rail, the binder-frame having the usual breastplate, the said grain-shield rail suitably connected to said breastplate whereby the said bar is supported from the binder-frame, substantially as described.

5. The combination with the main-wheel frame and main wheel of a harvester of an axle loosely supported in said main wheel, pinions upon said axle and quadrants secured to said frame which are adapted to be engaged by said pinions, a worm-wheel secured to said axle, a worm supported in a bracket swinging upon said axle, a link pivoted to said main frame, a bar connecting said link with said swinging bracket, a shaft to which the said worm is secured pivoted in said link and said bracket, a stop on the said shaft and a spring between said stop and said link, the said shaft provided with means whereby it can be rotated by the operator to raise or lower the machine to and from the ground, substantially as described.

6. The combination with the binder-frame of a radius-link pivoted to the upper end of the elevator-frame at one end, the other end pivoted to a point upon the upper portion of said binder-frame so as to move therewith, and a rocking support for said binder-frame having an arc eccentric to its pivotal axis, substantially as and for the purpose described.

WILLIAM BUTTERFIELD.

Witnesses:
 ARTHUR JOHNSON,
 CHAS. A. STEWARD.